United States Patent
Matsuda et al.

(10) Patent No.: US 10,353,568 B2
(45) Date of Patent: Jul. 16, 2019

(54) DISPLAY APPARATUS FOR CONTROLLING DISPLAY OF IMAGES BASED ON DETECTED TOUCH OPERATIONS

(71) Applicant: CASIO COMPUTER CO., LTD., Shibuya-ku, Tokyo (JP)

(72) Inventors: Hideaki Matsuda, Tokyo (JP); Jun Muraki, Hamura (JP); Hiroyuki Kato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 130 days.

(21) Appl. No.: 15/055,702

(22) Filed: Feb. 29, 2016

(65) Prior Publication Data

US 2016/0364110 A1  Dec. 15, 2016

(30) Foreign Application Priority Data

Jun. 11, 2015 (JP) ................................ 2015-117912

(51) Int. Cl.
*G06F 3/044* (2006.01)
*G06F 3/0488* (2013.01)
(Continued)

(52) U.S. Cl.
CPC .......... *G06F 3/0488* (2013.01); *G06F 3/0412* (2013.01); *G06F 3/0484* (2013.01); *G06F 3/04847* (2013.01); *G06F 3/04886* (2013.01); *H04N 21/42224* (2013.01); *H04N 21/47217* (2013.01); *G06F 2203/04803* (2013.01); *G06F 2203/04808* (2013.01)

(58) Field of Classification Search
CPC ...................................................... G06F 3/044
See application file for complete search history.

(56) References Cited

U.S. PATENT DOCUMENTS 7,355,620 B2  4/2008  Ikehata et al.
9,563,346 B2  2/2017  Shen
(Continued)

FOREIGN PATENT DOCUMENTS

CN  104238942 A  12/2014
JP  2004104594 A  4/2004
(Continued)

OTHER PUBLICATIONS

Japanese Office Action (and English translation thereof) dated Sep. 20, 2016, issued in counterpart Japanese Application No. 2015-117912.
(Continued)

*Primary Examiner* — Sanghyuk Park
(74) *Attorney, Agent, or Firm* — Holtz, Holtz & Volek PC

(57) ABSTRACT

A display apparatus includes a number-of-touches detecting unit, a first touch-area detecting unit and a first switching control unit. The number-of-touches detecting unit detects the number of touch operations when a user performs a plurality of touch operations on a touch panel. The first touch-area detecting unit detects areas, including touch positions of the plurality of touch operations, from a plurality of areas into which the touch panel is partitioned. The first switching control unit controls switching display, based on the number of detected touch operations and the detected areas.

23 Claims, 11 Drawing Sheets

(51) Int. Cl.
    *G06F 3/041*     (2006.01)
    *H04N 21/472*    (2011.01)
    *G06F 3/0484*    (2013.01)
    *H04N 21/422*    (2011.01)

(56) References Cited

U.S. PATENT DOCUMENTS

| | | | |
|---|---|---|---|
| 2008/0165141 A1* | 7/2008 | Christie | G06F 3/044 345/173 |
| 2010/0101872 A1 | 4/2010 | Ikeda et al. | |
| 2010/0110228 A1 | 5/2010 | Ozawa et al. | |
| 2011/0149138 A1* | 6/2011 | Watkins | G06F 3/0485 348/333.02 |
| 2011/0157055 A1* | 6/2011 | Tilley | G06F 3/017 345/173 |
| 2014/0168110 A1* | 6/2014 | Araki | G06F 3/016 345/173 |
| 2016/0070428 A1 | 3/2016 | Shen | |

FOREIGN PATENT DOCUMENTS

| | | |
|---|---|---|
| JP | 2010108011 A | 5/2010 |
| JP | 2010109788 A | 5/2010 |
| JP | 2010176575 A | 8/2010 |
| JP | 2010182185 A | 8/2010 |
| JP | 2010245843 A | 10/2010 |
| JP | 2011223163 A | 11/2011 |
| JP | 2012194727 A | 10/2012 |
| JP | 2013515444 A | 5/2013 |
| JP | 2013175214 A | 9/2013 |

OTHER PUBLICATIONS

Chinese Office Action (and English language translation thereof) dated Aug. 30, 2018 issued in counterpart Chinese Application No. 201610239444.X.

Japanese Office Action (and English translation thereof) dated Feb. 5, 2019 issued in counterpart Japanese Application No. 2016-240037.

* cited by examiner

FIG. 3A

| TOUCH AREA(S) | NUMBER OF TOUCHES | PROCESSING | AFTER PAUSE | |
|---|---|---|---|---|
| | | | AREA WHICH IS TOUCHED AFTER RELEASING TOUCH | PROCESSING |
| FIRST AREA | 1 | FORWARD 1X SPEED REPRODUCTION | — | — |
| FIRST AREA | 2 | FORWARD 2X SPEED REPRODUCTION | — | — |
| FIRST AREA | 3 | FORWARD 3X SPEED REPRODUCTION | — | — |
| SECOND AREA | 1 | BACKWARD 1X SPEED REPRODUCTION | — | — |
| SECOND AREA | 2 | BACKWARD 2X SPEED REPRODUCTION | — | — |
| SECOND AREA | 3 | BACKWARD 3X SPEED REPRODUCTION | — | — |
| FIRST AREA AND SECOND AREA | 2 | PAUSE | FIRST AREA | FORWARD FRAME ADVANCE |
| | | | SECOND AREA | BACKWARD FRAME ADVANCE |

FIG. 3B

| TOUCH AREA(S) | NUMBER OF TOUCHES | PROCESSING | AFTER PAUSE - AREA WHICH IS TOUCHED AFTER RELEASING TOUCH | AFTER PAUSE - PROCESSING |
|---|---|---|---|---|
| FIRST AREA | 1 | FORWARD 1X SPEED REPRODUCTION | — | — |
| FIRST AREA | 2 | FORWARD 2X SPEED REPRODUCTION | — | — |
| FIRST AREA | 3 | FORWARD 3X SPEED REPRODUCTION | — | — |
| SECOND AREA | 1 | BACKWARD 1X SPEED REPRODUCTION | — | — |
| SECOND AREA | 2 | BACKWARD 2X SPEED REPRODUCTION | — | — |
| SECOND AREA | 3 | BACKWARD 3X SPEED REPRODUCTION | — | — |
| THIRD AREA | 1 | FORWARD 1X SPEED REPRODUCTION | — | — |
| THIRD AREA | 2 | FORWARD 1/2X SPEED REPRODUCTION | — | — |
| THIRD AREA | 3 | FORWARD 1/3X SPEED REPRODUCTION | — | — |
| FOURTH AREA | 1 | BACKWARD 1X SPEED REPRODUCTION | — | — |
| FOURTH AREA | 2 | BACKWARD 1/2X SPEED REPRODUCTION | — | — |
| FOURTH AREA | 3 | BACKWARD 1/3X SPEED REPRODUCTION | — | — |
| FIRST AREA AND SECOND AREA | 2 | PAUSE | FIRST AREA | FORWARD FRAME ADVANCE |
| FIRST AREA AND SECOND AREA | 2 | PAUSE | SECOND AREA | BACKWARD FRAME ADVANCE |
| FIRST AREA AND THIRD AREA | 2 | JUMP TO END | — | — |
| FIRST AREA AND FOURTH AREA | 2 | PAUSE | FIRST AREA | FORWARD CHAPTER ADVANCE |
| FIRST AREA AND FOURTH AREA | 2 | PAUSE | FOURTH AREA | BACKWARD CHAPTER ADVANCE |
| SECOND AREA AND THIRD AREA | 2 | PAUSE | SECOND AREA | BACKWARD CHAPTER ADVANCE |
| SECOND AREA AND THIRD AREA | 2 | PAUSE | THIRD AREA | FORWARD CHAPTER ADVANCE |
| SECOND AREA AND FOURTH AREA | 2 | JUMP TO BEGINNING | — | — |
| THIRD AREA AND FOURTH AREA | 2 | PAUSE | THIRD AREA | FORWARD FRAME ADVANCE |
| THIRD AREA AND FOURTH AREA | 2 | PAUSE | FOURTH AREA | BACKWARD FRAME ADVANCE |

FIG. 6A

| TOUCH AREA(S) | NUMBER OF TOUCHES | TOUCH MODE | PROCESSING |
|---|---|---|---|
| FIRST AREA | 1 | — | FORWARD 1X SPEED REPRODUCTION |
| | 2 | SIMULTANEOUS OR CONSECUTIVE | FORWARD 2X SPEED REPRODUCTION |
| | 3 | SIMULTANEOUS OR CONSECUTIVE | FORWARD 3X SPEED REPRODUCTION |
| SECOND AREA | 1 | — | BACKWARD 1X SPEED REPRODUCTION |
| | 2 | SIMULTANEOUS OR CONSECUTIVE | BACKWARD 2X SPEED REPRODUCTION |
| | 3 | SIMULTANEOUS OR CONSECUTIVE | BACKWARD 3X SPEED REPRODUCTION |
| FIRST AREA AND SECOND AREA | 2 | SIMULTANEOUS | PAUSE |
| | | CONSECUTIVE (FIRST AREA IS FIRST TOUCHED) | FORWARD 1/2X SPEED REPRODUCTION |
| | | CONSECUTIVE (SECOND AREA IS FIRST TOUCHED) | BACKWARD 1/2X SPEED REPRODUCTION |

FIG. 6B

| TOUCH AREA(S) | NUMBER OF TOUCHES | TOUCH MODE | PROCESSING |
|---|---|---|---|
| FIRST AREA | 1 | — | FORWARD 1X SPEED REPRODUCTION |
| | 2 | SIMULTANEOUS OR CONSECUTIVE | FORWARD 2X SPEED REPRODUCTION |
| | 3 | SIMULTANEOUS OR CONSECUTIVE | FORWARD 3X SPEED REPRODUCTION |
| SECOND AREA | 1 | — | BACKWARD 1X SPEED REPRODUCTION |
| | 2 | SIMULTANEOUS OR CONSECUTIVE | BACKWARD 2X SPEED REPRODUCTION |
| | 3 | SIMULTANEOUS OR CONSECUTIVE | BACKWARD 3X SPEED REPRODUCTION |
| THIRD AREA | 1 | — | FORWARD 1X SPEED REPRODUCTION |
| | 2 | SIMULTANEOUS OR CONSECUTIVE | FORWARD 1/2X SPEED REPRODUCTION |
| | 3 | SIMULTANEOUS OR CONSECUTIVE | FORWARD 1/3X SPEED REPRODUCTION |
| FOURTH AREA | 1 | — | BACKWARD 1X SPEED REPRODUCTION |
| | 2 | SIMULTANEOUS OR CONSECUTIVE | BACKWARD 1/2X SPEED REPRODUCTION |
| | 3 | SIMULTANEOUS OR CONSECUTIVE | BACKWARD 1/3X SPEED REPRODUCTION |
| FIRST AREA AND SECOND AREA | 2 | SIMULTANEOUS | PAUSE |
| | | CONSECUTIVE (FIRST AREA IS FIRST TOUCHED) | FORWARD FRAME ADVANCE |
| | | CONSECUTIVE (SECOND AREA IS FIRST TOUCHED) | BACKWARD FRAME ADVANCE |
| FIRST AREA AND THIRD AREA | 2 | SIMULTANEOUS OR CONSECUTIVE | JUMP TO END |
| FIRST AREA AND FOURTH AREA | 2 | SIMULTANEOUS | PAUSE |
| | | CONSECUTIVE (FIRST AREA IS FIRST TOUCHED) | FORWARD CHAPTER ADVANCE |
| | | CONSECUTIVE (FOURTH AREA IS FIRST TOUCHED) | BACKWARD CHAPTER ADVANCE |
| SECOND AREA AND THIRD AREA | 2 | SIMULTANEOUS | PAUSE |
| | | CONSECUTIVE (SECOND AREA IS FIRST TOUCHED) | BACKWARD CHAPTER ADVANCE |
| | | CONSECUTIVE (THIRD AREA IS FIRST TOUCHED) | FORWARD CHAPTER ADVANCE |
| SECOND AREA AND FOURTH AREA | 2 | SIMULTANEOUS OR CONSECUTIVE | JUMP TO BEGINNING |
| THIRD AREA AND FOURTH AREA | 2 | SIMULTANEOUS | PAUSE |
| | | CONSECUTIVE (THIRD AREA IS FIRST TOUCHED) | FORWARD FRAME ADVANCE |
| | | CONSECUTIVE (FOURTH AREA IS FIRST TOUCHED) | BACKWARD FRAME ADVANCE |

DISPLAY APPARATUS FOR CONTROLLING DISPLAY OF IMAGES BASED ON DETECTED TOUCH OPERATIONS

CROSS-REFERENCE TO RELATED APPLICATION

This application is based upon and claims the benefit of priority from the prior Japanese Patent Application No. 2015-117912, filed on Jun. 11, 2015, and the entire contents of which are incorporated herein by reference.

BACKGROUND OF THE INVENTION

1. Field of the Invention

The present invention relates to a display apparatus and a display method.

2. Description of the Related Art

In the related art, there is known a display apparatus having an operation unit enabling a user to perform speed adjustment such as fast forwarding, rewinding, and slow motion reproduction in reproducing videos. The operation unit includes keys or dials of hardware. However, the operation unit is provided separately from a video display unit, and thus hinders the display apparatus from being downsized.

For this reason, there are disclosed a technology for controlling the speed of video reproduction according to the direction and speed of a slide operation on a touch panel as disclosed in JP-A-2004-104594, and a technology for semi-transparently displaying a plurality of reproduction speeds on the display of a video such that a user can recognize the relation between positions on a touch panel and the reproduction speeds, as disclosed in JP-A-2010-176575.

SUMMARY OF THE INVENTION (1) A display apparatus includes a touch panel, a display unit and a processor. The processor is configured to: perform switching display for switching an image displayed on the display unit to another image, based on touch operations of a user on the touch panel; detect the number of touch operations when the user performs a plurality of touch operations on the touch panel; detect areas, including touch positions of the plurality of touch operations, from a plurality of areas into which the touch panel is partitioned; and control the switching display, based on the number of detected touch operations and the detected areas.

(10) A display apparatus includes a touch panel; a display unit and a processor. The processor is configured to: perform switching display for switching an image displayed on the display unit to another image, based on touch operations of a user on the touch panel; detect each area, including each touch position of a plurality of touch operations which the user performs on the touch panel, from a plurality of areas into which the touch panel is partitioned; and control the switching display based on the plurality of detected areas.

(16) A display method using a display apparatus which performs switching display for switching an image displayed on a display unit to another image based on touch operations of a user on a touch panel, includes: detecting the number of touch operations when the user performs a plurality of touch operations on the touch panel; detecting areas, including touch positions of the plurality of touch operations, from a plurality of areas into which the touch panel is partitioned; and controlling the switching display, based on the number of detected touch operations and the detected areas.

(17) A display method using a display apparatus which performs switching display for switching an image displayed on a display unit to another image based on touch operations of a user on a touch panel, includes: detecting each area, including each touch position of a plurality of touch operations which the user performs on the touch panel, from a plurality of areas into which the touch panel is partitioned; and controlling the switching display based on the plurality of detected areas.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

If the following description is considered in conjunction with the following drawings, it is possible to more deeply understand this application.

FIGS. 3A and 3B are views illustrating examples of the contents of switching display processes which are performed by the display apparatus of FIG. 1.

FIGS. 6A and 6B are views illustrating examples of the contents of switching display processes which are performed by the display apparatus of FIG. 5.

DETAILED DESCRIPTION OF THE PREFERRED EMBODIMENTS

Figure 1:
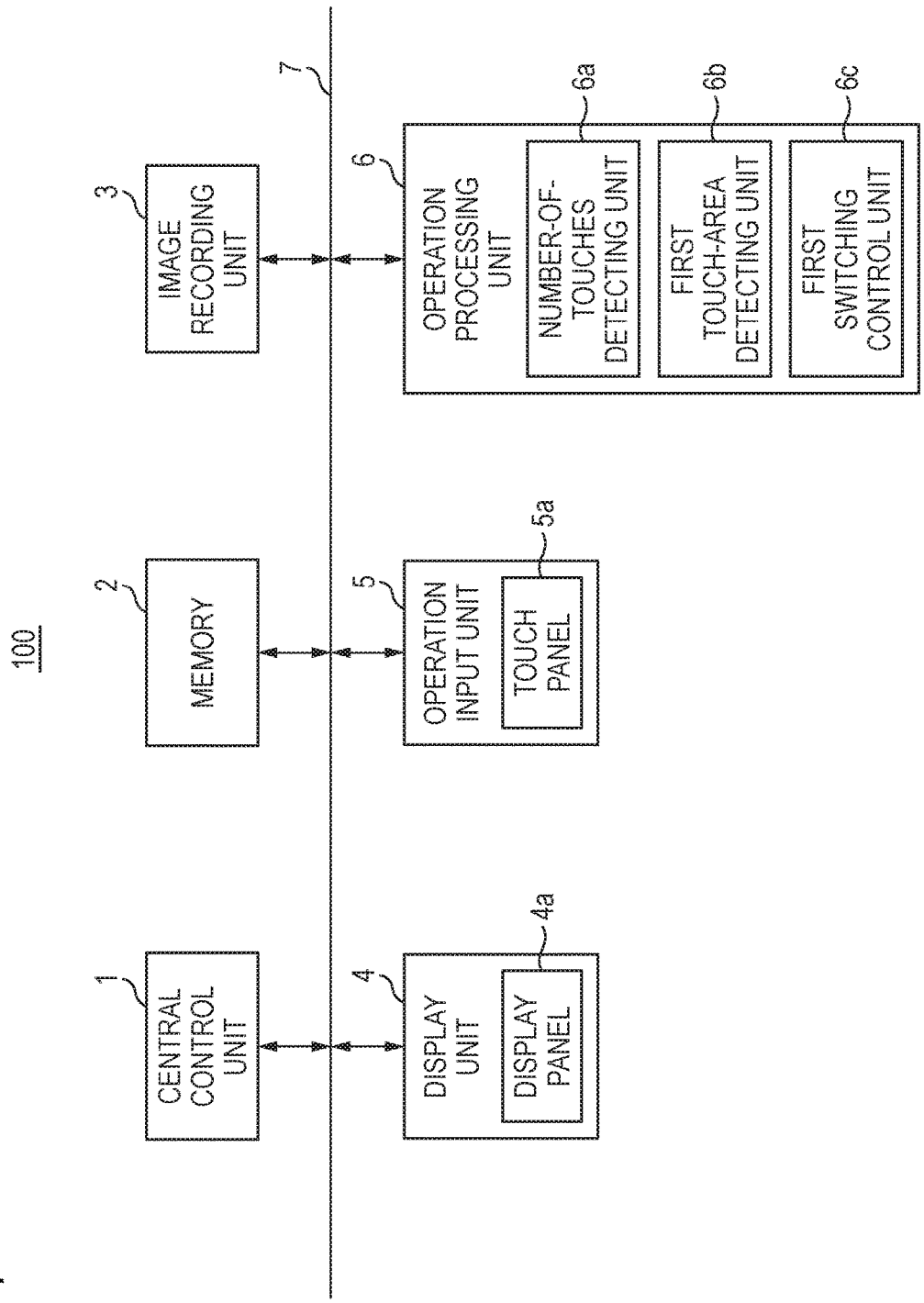
FIG. 1 is a block diagram illustrating a rough configuration of a display apparatus of a first embodiment according to the present invention.

Hereinafter, with respect to the present invention, specific embodiments will be described with reference to the accompanying drawings. However, the scope of the invention is not limited to examples shown in the drawings.

First Embodiment

FIG. 1 is a block diagram illustrating a rough configuration of a display apparatus 100 of a first embodiment according to the present invention.

As shown in FIG. 1, the display apparatus 100 of the first embodiment specifically includes a central control unit 1, a memory 2, an image recording unit 3, a display unit 4, an operation input unit 5, and an operation processing unit 6.

Also, the central control unit 1, the memory 2, the image recording unit 3, the display unit 4, the operation input unit 5, and the operation processing unit 6 are connected to one another through a bus line 7.

The central control unit 1 is for controlling the individual units of the display apparatus 100. Specifically, the central control unit 1 includes a processor (a central processing unit) and like (not shown), and performs various control operations according to various processing programs (not shown) for the display apparatus 100.

The memory 2 may be configured by a dynamic random access memory (DRAM) or the like, and temporarily stores data and the like to be processed by the central control unit 1, the operation processing unit 6, and so on.

The image recording unit 3 may be composed of a solid state drive (SSD), and in the image recording unit, image data on still images and videos encoded in a predetermined compression format (such as a JPEG format or a MPEG format) by an image processing unit (not shown) are recorded.

Also, image data recorded in the image recording unit 3 may be image data acquired by an imaging unit (not shown) of the display apparatus 100, and may be image data acquired by an external imaging apparatus (not shown) and transmitted to the display apparatus 100 and recorded in the image recording unit 3.

Also, the image recording unit 3 may be configured such that a recording medium (not shown) can be loaded to and unloaded from the image recording unit, and the image recording unit can control reading of data from a loaded recording medium and writing of data onto a recording medium.

The display unit 4 displays images on the display screen of a display panel 4a.

In other words, the display unit 4 displays designated images on the display screen of the display panel (a display unit) 4a based on image data having a predetermined size and decoded by the image processing unit (not shown). Also, the display unit 4 reproduces videos read from the image recording unit 3 at a predetermined reproduction frame rate (for example, 30 fps) under control of a first switching control unit 6c (to be described below) of the operation processing unit 6, as will be described below.

Also, the display panel 4a is composed of, for example, a liquid crystal display panel or an organic EL (electroluminescence) display panel, but is not limited to those examples.

The operation input unit 5 is for performing predetermined operations on the display apparatus 100. Specifically, the operation input unit 5 includes a power button related to an operation for turning on or off a power supply, selection determination buttons related to selection instructions of various modes, functions, and so on, etc (all of which are not shown).

Therefore, if various buttons are operated by a user, the operation input unit 5 outputs operation instructions according to the operated buttons, to the central control unit 1. The central control unit 1 performs control according to the operation instructions input from the operation input unit 5 such that the individual units perform predetermined operations (for example, video reproduction).

Also, the operation input unit 5 includes a touch panel 5a provided integrally with the display panel 4a of the display unit 4.

The touch panel 5a detects the positions of direct or indirect touches of user's fingers (hands), touch pens, and the like on a display screen forming the display area of the display panel 4a. In other words, the touch panel 5a may be provided on the display screen of the display panel 4a or may be provided on the inner side from the display screen, and detects the X and Y coordinates of the positions of touches on the display screen at predetermined sampling intervals by various systems such as an electrostatic capacity system, a resistive film system, and an ultrasonic surface acoustic wave system. Then, the touch panel 5a outputs position signals related to the X and Y coordinates of the positions of touches, to the operation processing unit 6.

Figure 2A:
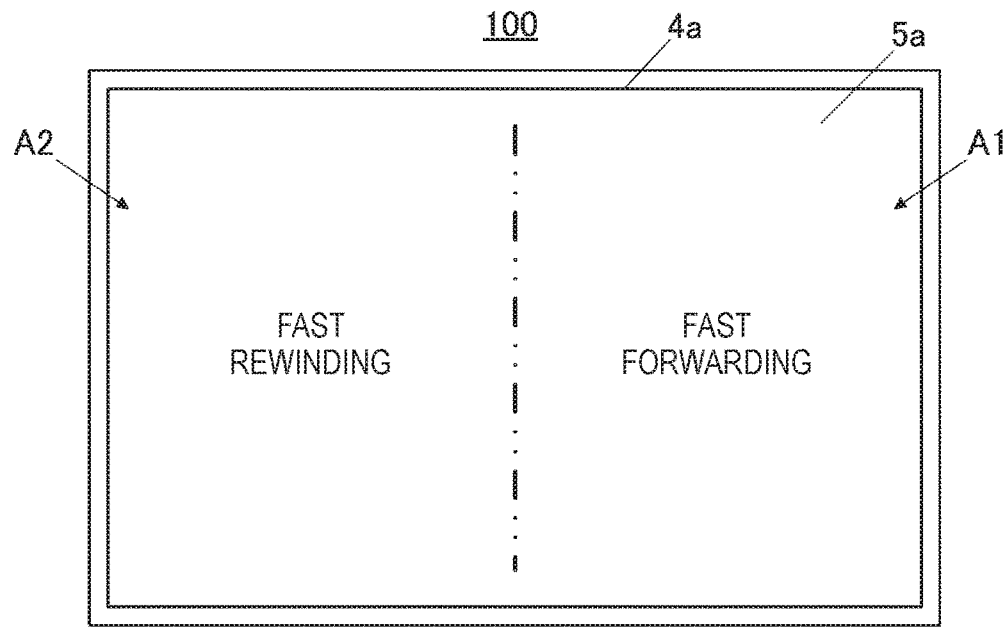
FIGS. 2A and 2B are views schematically illustrating examples of a plurality of areas into which a touch panel of the display apparatus of FIG. 1 is partitioned.
Figure 2B:
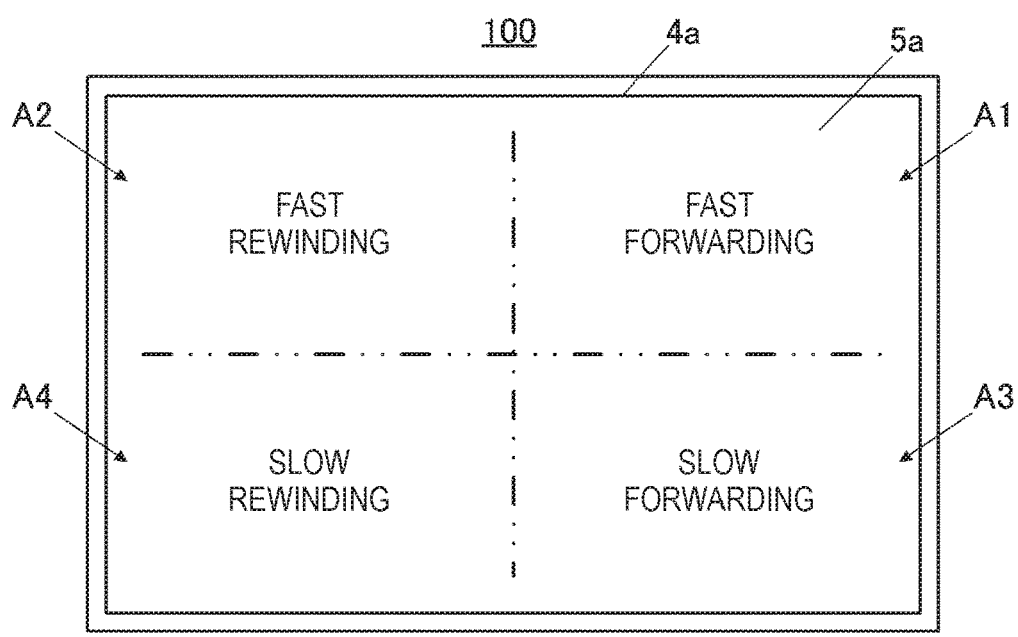

Also, the touch panel 5a is partitioned into a plurality of areas in a predetermined state such as a state where video reproduction is being performed (see FIGS. 2A and 2B).

For example, in a case where the touch panel 5a is equally portioned into two areas as shown in FIG. 2A, a first area A1 and a second area A2 are provided on the right side and the left side, respectively, as seen from a user facing the touch panel. Meanwhile, for example, in a case where the touch panel 5a is equally partitioned into four areas as shown in FIG. 2B, a first area A1, a second area A2, a third area A3, and a fourth area A4 are provided on the upper right side, the upper left side, the lower right side, and the lower left side, respectively, as seen from a user facing the touch panel.

Also, the areas shown in FIGS. 2A and 2B are examples of a plurality of areas into which the touch panel 5a is partitioned, and the number, shapes, arrangement, and the like of areas into which the touch panel is partitioned can be appropriately and arbitrarily changed. For example, the number of areas may be an odd number, and the shapes, areas, and so on of the plurality of areas may be set so as to be different from one another.

Also, the plurality of areas into which the touch panel 5a is partitioned is associated with different switching directions, respectively, for example, in a switching display process which is performed by the first switching control unit 6c (to be described below) of the operation processing unit 6.

Here, for example, in a case where a display object is a video, the switching directions mean advance directions of a plurality of frame images constituting the video, and examples thereof include a forward direction and a backward direction.

Specifically, for example, in the case where the touch panel 5a is partitioned into two areas of the first area A1 and the second area A2 (see FIG. 2A), the forward direction is associated as a switching direction with the first area A1, and the backward direction is associated as a switching direction with the second area A2. Also, as will be described below, in the switching display process which is performed by the first switching control unit 6c, the speed of frame image switching is controlled according to the number of touch operations on the individual areas of the touch panel 5a, and the first area A1 is associated with a "FAST FORWARDING" mode for switching frame images forward at a speed higher than a normal switching speed, and the second area A2 is associated with a "FAST REWINDING" mode for switching frame images backward in a speed higher than the normal switching speed.

Meanwhile, for example, in the case where the touch panel 5a is partitioned into four areas of the first to fourth areas A1 to A4 (see FIG. 2B), the forward direction is associated as a switching direction with the first area A1 and the third area A3, and the backward direction is associated as a switching direction with the second area A2 and the fourth area A4. Also, as described above, in the switching display process which is performed by the first switching control unit 6c, the first area A1 is associated with the "FAST FORWARDING" mode for switching frame images forward at the speed higher than the normal switching speed, and the second area A2 is associated with the "FAST REWINDING" mode for switching frame images backward at the speed higher than the normal switching speed, and the third area A3 is associated with a "SLOW FORWARDING" mode for switching frame images forward at a speed lower than the normal switching speed, and the fourth area A4 is associated with a "SLOW REWINDING" mode for switching frame images backward at a speed lower than the normal switching speed.

Also, FIGS. 2A and 2B schematically show examples of the plurality of areas into which the touch panel 5a provided integrally with the display panel 4a is partitioned, and broken lines shown as the boundaries between the areas in FIGS. 2A and 2B, and words "FAST FORWARDING", "FAST REWINDING", "SLOW FORWARDING", and "SLOW REWINDING" shown in FIGS. 2A and 2B are not actually displayed on the display panel 4a.

The operation processing unit 6 includes a number-of-touches detecting unit 6a, a first touch-area detecting unit 6b, and the first switching control unit 6c.

Also, each unit of the operation processing unit 6 is composed of, for example, a predetermined block circuit; however, this configuration is an example, and the operation processing unit is not limited thereto.

The number-of-touches detecting unit (a number detecting unit) 6a detects the number of a plurality of touch operations. The plurality of touch operations are include simultaneous touch operations or a sequence of consecutive touch operations, which are performed on the touch panel 5a by the user.

Here, simultaneous touch operations or a sequence of consecutive touch operations, which are performed on the touch panel 5a by the user, indicate a sequence of touch operations related to each other. In short, the number of simultaneous touch operations, the number of touch operations having time intervals, and the like are not restricted, and the number of simultaneous touch operations may be one or more, and the number of touch operations having time intervals may be one or more. In other words, examples of simultaneous touch operations or a sequence of consecutive touch operations include simultaneous touch operations which are performed at a plurality of touch positions on the touch panel 5a by the user, and touch operations which are performed at a plurality of positions on the touch panel 5a by the user and in which one touch position (for example, a touch position included in the first area A1) of the touch positions is kept at the touch state while the other touch position (for example, a touch position included in the second area A2) is released from the touch state and then returns to the touch state.

Also, simultaneous touch operations which are performed on the touch panel 5a include touch operations which are performed at individual touch positions on the touch panel 5a at a time interval by the user, in a case where touch states of the touch positions can be simultaneously secured (can be detected and recognized). In other words, touch operations which are performed at individual touch positions on the touch panel 5a at a time interval by the user can considered as simultaneous touch operations as long as simultaneous touches of the user on the touch positions of the touch panel 5a can be secured.

In a case where the user performs simultaneous touch operations or a sequence of consecutive touch operations on the touch panel 5a, the number-of-touches detecting unit 6a acquires a position signal related to the X and Y coordinates of a touch position output from the touch panel 5a whenever a touch operation is performed on the touch panel 5a, and detects the number of touch operations based on the acquired position signals. Specifically, for example, in a case of acquiring a position signal related to one pair of X and Y coordinates of the touch panel 5a, the number-of-touches detecting unit 6a detects that the user has performed a touch operation on one position of the touch panel 5a and the number of touch operations is 1. Meanwhile, for example, in a case of acquiring position signals related to a plurality of (for example, two) different pairs of X and Y coordinates of the touch panel 5a, the number-of-touches detecting unit 6a detects that the user has performed touch operations on a plurality of different positions (for example, two positions) of the touch panel 5a and the number of touch operations is two or more (for example, 2).

Here, detection of the number-of-touches detecting unit 6a on the number of touch operations is performed, for example, in a period when the number-of-touches detecting unit continuously acquires position signals based on continuous touch operations of the user on the touch panel 5a, or a predetermined period from when the number-of-touches detecting unit acquires a position signal based on the first touch operation of the user on the touch panel 5a.

The first touch-area detecting unit (an area detecting unit) 6b detects areas, including the touch positions subjected to individual touches of simultaneous touch operations or a sequence of consecutive touch operations of the user, of the plurality of areas into which the touch panel 5a is partitioned.

In other words, if the user performs simultaneous touch operations or a sequence of consecutive touch operations on the touch panel 5a, the first touch-area detecting unit 6b acquires position signals related to the X and Y coordinates of the touch positions output from the touch panel 5a, and detects areas, where the acquired position signals are included, of the plurality of areas into which the touch panel 5a is partitioned. Specifically, for example, in a case of acquiring a position signal related to one pair of X and Y coordinates of the touch panel 5a, the first touch-area detecting unit 6b detects one area (for example, the first area A1) where the acquired position signal is included. Meanwhile, for example, in a case of acquiring position signals related to a plurality of (for example, two) different pairs of X and Y coordinates of the touch panel 5a, the first touch-area detecting unit 6b detects a plurality of areas (for example, the first area A1 and the second area A2) where the acquired individual position signals are included, respectively.

Here, touch area detection of the first touch-area detecting unit 6b is performed, for example, in a period when the first touch-area detecting unit continuously acquires position signals based on continuous touch operations of the user on the touch panel 5a, or a predetermined period from when the first touch-area detecting unit acquires a position signal based on the first touch operation of the user on the touch panel 5a.

The first switching control unit 6c controls reproduction of a video displayed on the display unit 4, that is, switching display of a plurality of frame images constituting the corresponding video.

In other words, the operation processing unit 6 includes, for example, a video random access memory (VRAM), a VRAM controller, a digital video encoder, and so on (all of which are not shown). In this configuration, the digital video encoder reads a luminance signal Y and color-difference signals Cb and Cr decoded by the image processing unit (not shown) and recorded in the VRAM, from the VRAM through the VRAM controller, at a predetermined reproduction frame rate (for example, 30 fps), and generates a video signal based on data on those signals, and outputs the video signal to the display panel 4a of the display unit 4.

In this case, the first switching control unit (a control unit) 6c controls switching display for switching a frame image displayed on the display panel 4a to another frame image (a switching display process), based on the number of touch operations detected by the number-of-touches detecting unit 6a, and areas of touch panel 5a detected by the first touch-area detecting unit 6b. For example, in a case where one area (for example, the first area A1) is detected by the first touch-area detecting unit 6b, the first switching control unit 6c performs control for adjusting the switching speed for switching a plurality of frame images constituting the video in a switching direction (for example, the forward direction) associated with the detected area, according to the number of touch operations detected by the number-of-touches detecting unit 6a.

For example, as shown in FIG. 3A, in the case where the touch panel 5a is partitioned into two areas of the first area A1 and the second area A2, in a case where a touch area of the user is the first area A1, if the number of touches is "1", a "FORWARD 1× SPEED REPRODUCTION" process for switching frame images forward at 1× speed is performed, and if the number of touches is "2", a "FORWARD 2× SPEED REPRODUCTION" process for switching frame images forward at 2× speed is performed, and if the number of touches is "3", a "FORWARD 3× SPEED REPRODUCTION" process for switching frame images forward at 3× speed is performed. Also, in a case where a touch area of the user is the second area A2, if the number of touches is "1", a "BACKWARD 1× SPEED REPRODUCTION" process for switching frame images backward at 1× speed is performed, and if the number of touches is "2", a "BACKWARD 2× SPEED REPRODUCTION" process for switching frame images backward at 2× speed is performed, and if the number of touches is "3", a "BACKWARD 3× SPEED REPRODUCTION" process for switching frame images backward at 3× speed is performed.

Also, for example, as shown in FIG. 3bB, in a case where the touch panel 5a is partitioned into four areas of the first to fourth areas A1 to A4, if touch areas of are the first area A1 and the second area A2, the same processes as those in FIG. 3A described above are performed. Also, in a case where a touch area of the user is the third area A3, if the number of touches is "1", a "FORWARD 1× SPEED REPRODUCTION" process for switching frame images forward at 1× speed is performed, and if the number of touches is "2", a "FORWARD ½× SPEED REPRODUCTION" process for switching frame images forward at ½× speed is performed, and if the number of touches is "3", a "FORWARD ⅓× SPEED REPRODUCTION" process for switching frame images forward at ⅓× speed is performed. Also, in a case where a touch area of the user is the fourth area A4, if the number of touches is "1", a "BACKWARD 1× SPEED REPRODUCTION" process for switching frame images backward at 1× speed is performed, and if the number of touches is "2", a "BACKWARD ½× SPEED REPRODUCTION" process for switching frame images backward at ½× speed is performed, and if the number of touches is "3", a "BACKWARD ⅓× SPEED REPRODUCTION" process for switching frame images backward at ⅓× speed is performed.

Also, the switching speed adjustment described above is performed, for example, only in a period when the user touches the touch panel 5a. After touching finishes, returning to forward reproduction at 1× speed may be performed, or even after touching finishes, the image switching speed adjusted according to the number of touch operations may be kept. Whether to perform returning to forward 1× speed reproduction or keep the adjusted switching speed can be appropriately and arbitrarily selected by the user.

Also, as an example of a specific method of adjusting the switching speed, setting of a reproduction frame rate or a decimation rate can be taken. However, setting of a reproduction frame rate or a decimation rate is a known technology, and thus a detailed description thereof will not be made.

Also, for example, in a case where a plurality of areas (for example, the first area A1 and the second area A2) is detected by the first touch-area detecting unit 6b, the first switching control unit 6c controls switching display with the control content other than adjustment on the switching speed of a plurality of frame images constituting the video.

Here, as examples of the control content other than adjustment on the frame image switching speed, a pause in a state where a frame image displayed on the display panel 4a at the time of a user's touch operation on the touch panel 5a is kept, switching to a predetermined image such as the first frame image or the last frame image constituting the video, or the first frame image of each chapter can be taken.

Also, chapter setting on a video may be automatically performed by a known technology or may be manually performed by the user, for example, when the video is made or recorded.

Specifically, for example, if simultaneous touch operations on a plurality of areas (for example, the first area A1 and the second area A2) are performed as a plurality of touch operations which is performed on the touch panel 5a by the user, whereby the plurality of areas is detected by the first touch-area detecting unit 6b, the first switching control unit 6c pauses the video while keeping a frame image displayed on the display panel 4a. In this case, if the user keeps one touch position (for example, a touch position included in the first area A1) of the plurality of touch positions included in the plurality of areas while releasing the other touch position (for example, a touch position included in the second area A2) from the touch state and then performing a touch operation for returning the corresponding touch position to the touch state, the first switching control unit 6c performs switching to a predetermined image by image advance of one or more frame images in a predetermined direction (for example, the forward direction or the backward direction).

For example, as shown in FIG. 3A, in a case where the touch panel 5a is partitioned into two areas of the first area A1 and the second area A2, if the user simultaneously performs touch operations on the first area A1 and the second area A2 (touch areas are the first area A1 and the second area A2 and the number of touches is "2"), a "PAUSE" process is performed while a frame image displayed on the display panel 4a is kept. In this case, if the area which is released from the touch state and then is subjected to a touch operation, thereby returning to the touch state (the area which is released from the touch state and is touched again) is the first area A1, a "FORWARD FRAME ADVANCE" process for switching images of one frame forward is performed, and if the area which is released from the touch state and is touched again is the second area A2, a "BACKWARD FRAME ADVANCE" process for switching images of one frame backward is performed.

Also, for example, as shown in FIG. 3bB, in a case where the touch panel 5a is partitioned into four areas of the first to fourth areas A1 to A4, if touch operations are performed on the first area A1 and the second area A2, the same processes as those in FIG. 3A described above are performed. Also, if the user simultaneously performs touch operations on the first area A1 and the third area A3 (touch areas are the first area A1 and the third area A3 and the number of touches is "2"), a "JUMP TO END" process for switching a frame image displayed on the display panel 4a to the last frame image is performed. Meanwhile, if the user simultaneously performs touch operations on the first area A1 and the fourth area A4 (touch areas are the first area A1 and the fourth area A4 and the number of touches is "2"), a "PAUSE" process is performed while a frame image displayed on the display panel 4a is kept. In this case, if the first area A1 is released from the touch state and is touched again, as the subsequent process, a "FORWARD CHAPTER ADVANCE" process for switching to the first frame image of the next chapter in the forward direction is performed; whereas, if the fourth area A4 is released from the touch state and is touched again, as the subsequent process, a "BACKWARD CHAPTER ADVANCE" process for switching to the first frame image of the next chapter in the backward direction is performed. Meanwhile, if the user simultaneously performs touch operations on the second area A2 and the third area A3 (touch areas are the second area A2 and the third area A3 and the number of touches is "2"), a "PAUSE" process is performed while a frame image displayed on the display panel 4a is kept. In this case, if the second area A2 is released from the touch state and is touched again, as the subsequent process, a "BACKWARD CHAPTER ADVANCE" process is performed; whereas, if the third area A3 is released from the touch state and is touched again, as the subsequent process, a "FORWARD CHAPTER ADVANCE" process is performed. Meanwhile, if the user simultaneously performs touch operations on the second area A2 and the fourth area A4 (touch areas are the second area A2 and the fourth area A4 and the number of touches is "2"), a "JUMP TO BEGINNING" process for switching a frame image displayed on the display panel 4a to the first frame image is performed. Meanwhile, if the user simultaneously performs touch operations on the third area A3 and the fourth area A4 (touch areas are the third area A3 and the fourth area A4 and the number of touches is "2"), a "PAUSE" process is performed while a frame image displayed on the display panel 4a is kept. In this case, if the third area A3 is released from the touch state and is touched again, as the subsequent process, a "FORWARD FRAME ADVANCE" process is performed; whereas, if the fourth area A4 is released from the touch state and is touched again, as the subsequent process, a "BACKWARD FRAME ADVANCE" process is performed.

Also, the processes shown in FIGS. 3A and 3B are examples of switching display processes, and the speeds and directions of frame image switching, the contents of the processes, and so on can be appropriately and arbitrarily changed. For example, in a case of adjusting the image switching speed, the number of touches may be set as a multiplier in order to change a weight. Also, in a case where the touch panel 5a is partitioned into three or more areas, the number of touch operations which can be simultaneously performed may be three or more.

<Reproducing Process>

Now, a reproducing process which is performed by the display apparatus 100 will be described with reference to FIG. 4.

Figure 4:
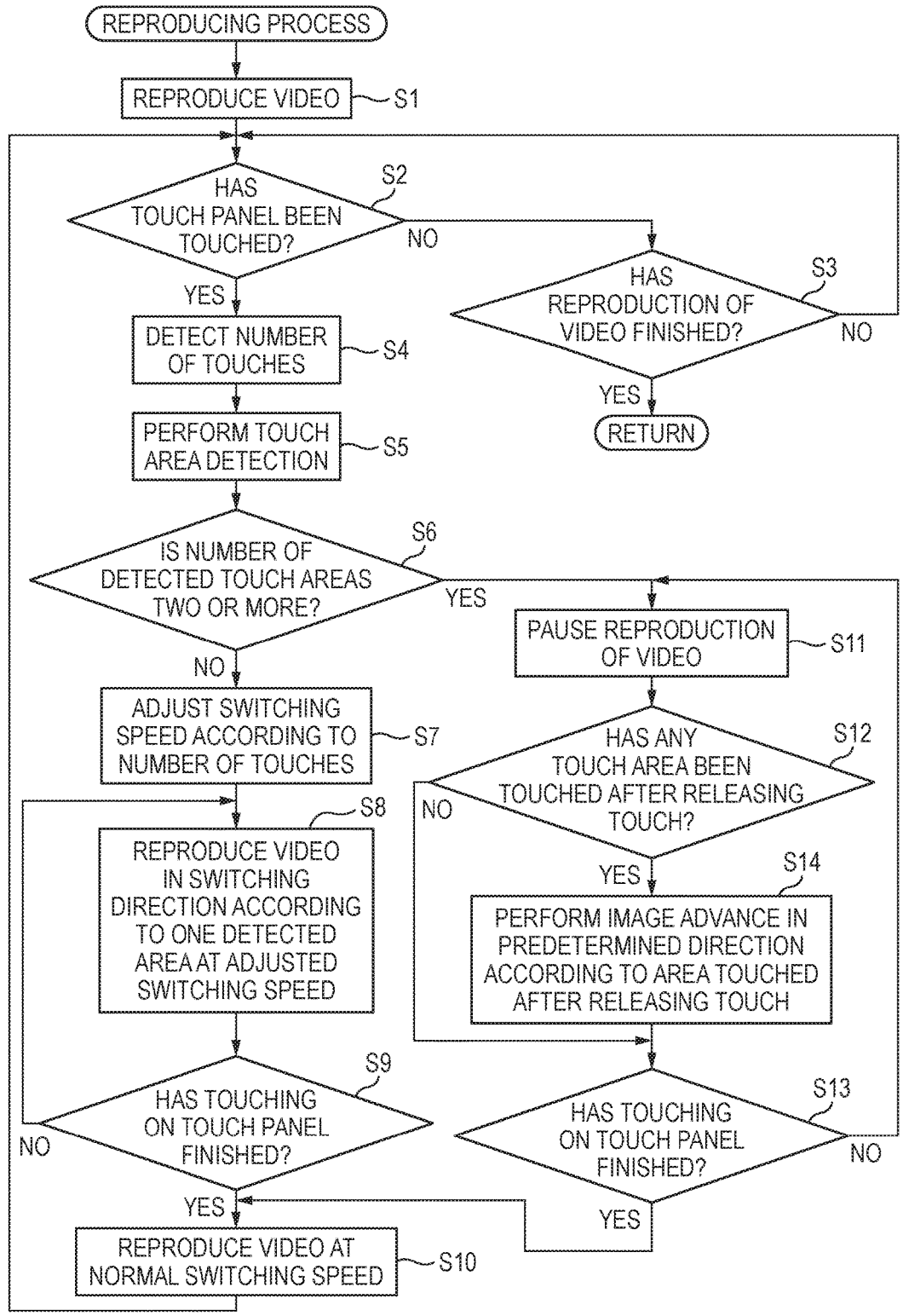
FIG. 4 is a flow chart illustrating examples of operations related to a reproducing process which is performed by the display apparatus of FIG. 1.

FIG. 4 is a flow chart illustrating examples of operations related to the reproducing process.

Also, on the assumption that the touch panel 5a is partitioned into two areas of the first area A1 and the second area A2, the reproducing process will be described below. Also, it is assumed that adjustment on the speed of switching of frame images is performed only in a period when the user touches the touch panel 5a.

As shown in FIG. 4, if a video is first designated, as a display object, from among videos recorded in the image recording unit 3, based on a predetermined operation performed on the operation input unit 5 by the user, the operation processing unit 6 reads the designated video from the image recording unit 3, and outputs a plurality of frame images constituting the video and decoded by the image processing unit (not shown), to the display unit 4, and the first switching control unit 6c reproduces the video on the display panel 4a at a predetermined reproduction frame rate (for example, 30 fps) in STEP S1.

Subsequently, in STEP S2, the operation processing unit 6 determines whether the touch panel 5a has been touched by the user.

If it is determined in STEP S2 that the touch panel 5a has not been touched ("NO" in STEP S2), in STEP S3, the operation processing unit 6 determines whether reproduction of the video has finished.

If it is determined in STEP S3 that reproduction of the video has not finished ("NO" in STEP S3), the operation processing unit 6 returns the reproducing process to STEP S2, thereby repeatedly performing the process of determining whether the touch panel 5a has been touched, at predetermined time intervals.

Meanwhile, if it is determined in STEP S3 that reproduction of the video has finished ("YES" in STEP S3), the operation processing unit 6 finishes the reproducing process.

If it is determined in STEP S2 that the touch panel 5a has been touched ("YES" in STEP S2), in STEP S4, the number-of-touches detecting unit 6a acquires position signals related to the X and Y coordinates of touch positions and output from the touch panel 5a, and detects the number of touch operations based on the acquired position signals. Subsequently, in STEP S5, the first touch-area detecting unit 6b acquires the position signals related to the X and Y coordinates of touch positions and output from the touch panel 5a, and detects areas where the acquired position signals are included, from among the plurality of areas into which the touch panel 5a is partitioned.

Also, the order of detection of STEP S4 on the number of touch operations and detection of STEP S5 on touch areas is an example, and the present invention is not limited thereto. For example, the detection order may be reversed.

Subsequently, in STEP S6, the first switching control unit 6c determines whether a plurality of areas (for example, the first area A1 and the second area A2) has been detected by the first touch-area detecting unit 6b.

If it is determined in STEP S6 that a plurality of areas has not been detected ("NO" in STEP S6), in STEP S7, the first switching control unit 6c adjusts the switching speed (for example, to 2× speed) for switching a plurality of frame images constituting the video, according to the number of touch operations (for example, "2") detected by the number-of-touches detecting unit 6a. Subsequently, in STEP S8, the first switching control unit 6c reproduces the video at the adjusted switching speed by switching display (for example, forward 2× speed reproduction) for switching a plurality of frame images in a switching direction (for example, forward advance) associated with the detected one area (for example, the first area A1) detected by the first touch-area detecting unit 6b.

Subsequently, in STEP S9, the operation processing unit 6 determines whether touching of the user on the touch panel 5a has finished.

If it is determined in STEP S9 that touching of the user on the touch panel 5a has not finished ("NO" in STEP S9), the first switching control unit 6c returns the reproducing process to STEP S8 and then performs the process of STEP S8 and the subsequent processes. In other words, as described above, the processes of STEPS S8 and S9 are subsequently performed, whereby switching display of a plurality of frame images according to the touching of the user on the touch panel 5a is performed.

If it is determined in STEP S9 that touching of the user on the touch panel 5a has finished ("YES" in STEP S9), in STEP S10, the first switching control unit 6c returns the speed of switching of a plurality of frame images to a normal switching speed (for example, 1× speed), and reproduces the video.

Thereafter, the operation processing unit 6 returns the reproducing process to STEP S2.

Meanwhile, if it is determined in STEP S6 that a plurality of areas has been detected ("YES" in STEP S6), in STEP S11, the first switching control unit 6c pauses the video while keeping a frame image displayed on the display panel 4a.

Subsequently, in STEP S12, the operation processing unit 6 determines whether any of the touch positions touched by the user has been released from the touch state and has been subjected to a touch operation, thereby returning to the touch state again.

If it is determined in STEP S12 that any of the touch positions touched by the user has not been released from the touch state and has not been subjected to a touch operation for returning to the touch state again ("NO" in STEP S12), in STEP S13, the operation processing unit 6 determines whether touching of the user on the touch panel 5a has finished.

If it is determined in STEP S13 that touching of the user on the touch panel 5a has not finished ("NO" in STEP S13), the first switching control unit 6c returns the reproducing process to STEP S11 in which the first switching control unit keeps the pause of the video with the frame image displayed on the display panel 4a.

If it is determined in STEP S12 that any of the touch positions touched by the user has been released from the touch state and has been subjected to a touch operation, thereby returning to the touch state again ("YES" in STEP S12), in STEP S14, the first switching control unit 6c performs switching to a predetermined image by image advance (for example, forward frame advance) for switching of images of one frame in a predetermined direction (for example, the forward direction) according to an area (for example, the first area A1) including a touch position having released from the touch state and having subjected to a touch operation for returning to the touch state again.

Thereafter, the operation processing unit 6 advances the reproducing process to STEP S13, and determines whether touching of the user on the touch panel 5a has finished, in STEP S13.

If it is determined in STEP S13 that touching of the user on the touch panel 5a has not finished ("NO" in STEP S13), the first switching control unit 6c returns the reproducing process to STEP S11, and performs the process of STEP S11 and the subsequent processes. In other words, as described above, the individual processes of STEPS S11 to S14 are subsequently performed, whereby switching display of a plurality of frame images according to touching of the user on the touch panel 5a is performed.

If it is determined in STEP S13 that touching of the user on the touch panel 5a has finished ("YES" in STEP S13), the first switching control unit 6c advances the reproducing process to STEP S10. In STEP S10, the first switching control unit returns the speed of switching of a plurality of frame images to the normal switching speed (for example, 1× speed), and reproduces the video.

Thereafter, the operation processing unit 6 returns the reproducing process to STEP S2.

As described above, according to the display apparatus 100 of the first embodiment, if the user performs simultaneous touch operations or a sequence of consecutive touch operations on the touch panel 5a, the display apparatus controls switching display for switching a frame image displayed on the display panel 4a to another frame image, based on the number of the touch operations, and areas, including touch positions simultaneously or consecutively touched by the user, of the plurality of areas into which the touch panel 5a is partitioned. Therefore, it is possible to increase selectable types of frame image switching display in association with combinations of the numbers and areas of touch operations which are performed simultaneous touch operations or in sequences of consecutive touch operations of the user, and even if an installable touch panel 5a is limited in size, it is possible to suppress a reduction in operability enabling the user to select predetermined switching display.

Also, the plurality of areas into which the touch panel 5a is partitioned is associated with different switching directions for switching display, respectively, and in a case where one area of the touch panel 5a is touched when the user performs a plurality of touch operations, control is performed to adjust the switching speed according to the number of touch operations, such that switching of frame images is performed at the adjusted switching speed in a switching direction associated with the corresponding area. Therefore, it is possible to change the switching direction and the switching speed according to the number of touch operations and touch positions in a sequence of touch operations which are performed on the touch panel 5a by the user, and the user can implement selection of predetermined switching display by an easier operation.

Further, in a case where a plurality of areas of the touch panel 5a is touched when the user performs a plurality of touch operations, control on switching display is performed with the control content other than adjustment on the frame image switching speed. Therefore, according to the modes of touch operations when the user performs a plurality of touch operations on the touch panel 5a, it is possible to perform, for example, a pause in a state where a frame image displayed on the display unit 4 is kept, switching to a predetermined image, and so on, and the user can implement selection of predetermined switching display by an easier operation. Specifically, after the plurality of areas of the touch panel 5a is touched by the user, whereby the video is paused while a frame image displayed on the touch panel 5a is kept, if any one touch position of a plurality of touch positions included in the plurality of areas of the touch panel 5a is kept in the touch state while another touch position is released from the touch state and is touched again, thereby returning to the touch state, switching to a predetermined image is performed by any one of advance processes of one or more images, whereby it is possible to implement a variety of switching display by easy operations such as release of touching and retouching.

Also, since a plurality of touch operations which is performed on the touch panel 5a by the user may be touch operations which are performed at individual touch positions on the touch panel 5a at a time interval as long as touch states of the touch positions can be simultaneously secured, the timings of the touch operations on the plurality of touch positions of the touch panel 5a do not need to be exactly simultaneous, and the user can implement selection of predetermined switching display by an easier operation.

Second Embodiment

Hereinafter, a display apparatus 200 of a second embodiment will be described with reference to FIGS. 5 to 8.

Figure 5:
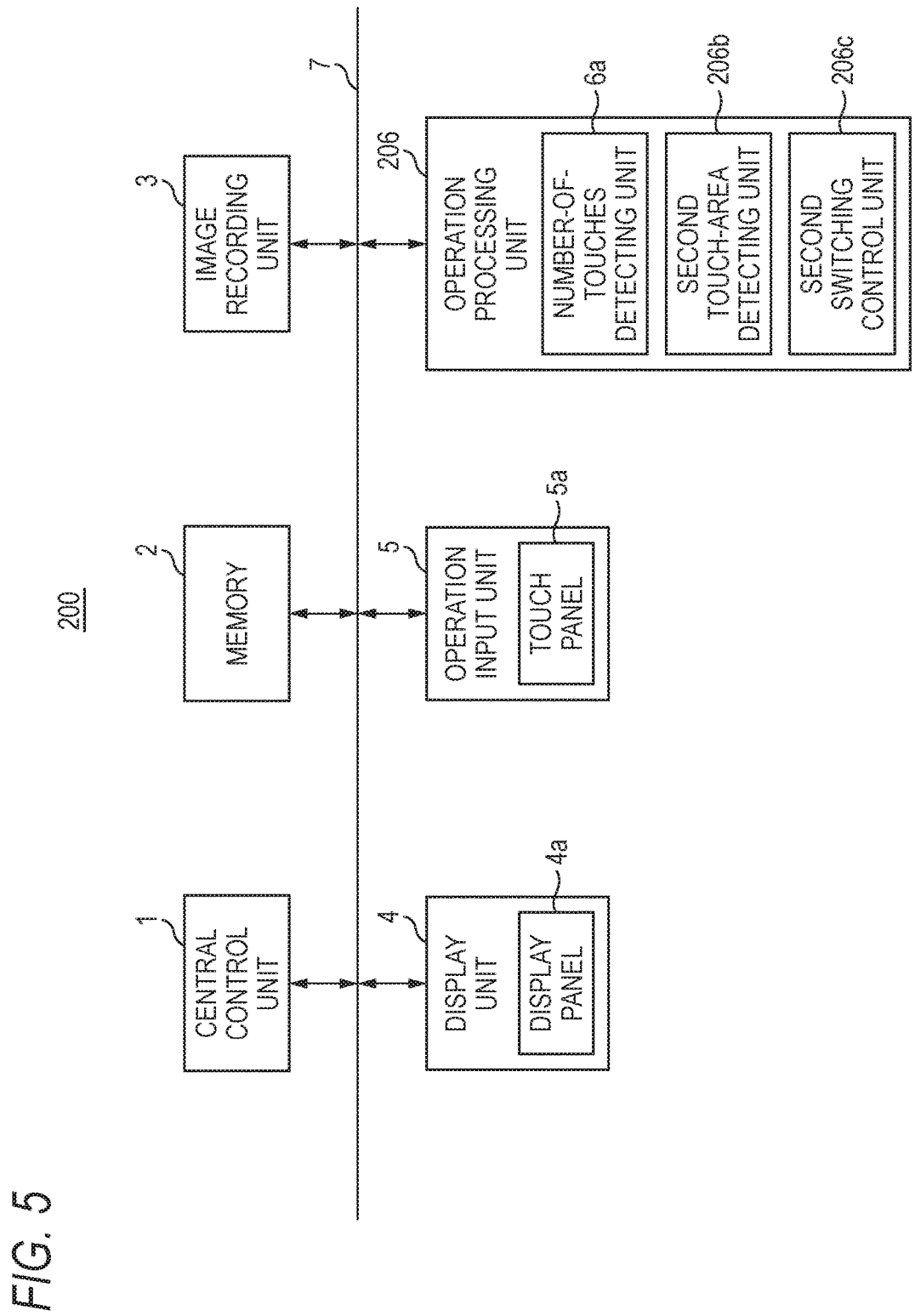
FIG. 5 is a block diagram illustrating a rough configuration of a display apparatus of a second embodiment according to the present invention.

FIG. 5 is a block diagram illustrating a rough configuration of the display apparatus 200 of the second embodiment according to the present invention.

Also, the configuration and functions of the display apparatus 200 other than points to be described below are substantially identical to those of the display apparatus 100 of the first embodiment described above, and thus a description thereof will not be made.

As shown in FIG. 5, an operation processing unit 206 includes a number-of-touches detecting unit 6a, a second touch-area detecting unit 206b, and a second switching control unit 206c.

Similarly to the first touch-area detecting unit 6b, the second touch-area detecting unit 206b detects areas, including touch positions touched in a user's simultaneous or consecutive touch operations, of the plurality of areas into which the touch panel 5a is partitioned. Also, in a case where a plurality of touch operations is performed at a time interval when the user performs a plurality of touch operations on the touch panel 5a, specifically, in a case where the user performs a plurality of consecutive touch operations on the touch panel 5a within a predetermined time (for example, 500 ms), the second touch-area detecting unit 206b detects the order of the touch operations performed on a plurality of areas.

Here, examples of a plurality of touch operations which is performed on the touch panel 5a by the user include a plurality of touch operations which the user consecutively performs on some areas of the touch panel 5a within the predetermined time, in addition to the examples shown in the first embodiment such as simultaneous touch operations which are performed at a plurality of touch positions on the touch panel 5a by the user, and touch operations which are performed at a plurality of positions on the touch panel 5a by the user and in which one touch position of the touch positions is kept at the touch state while the other touch position is released from the touch state and then returns to the touch state.

Also, in a case where the user consecutively performs a plurality of touch operations on the touch panel 5a, for example, the user may release the touch state of a previous touch operation and then perform the next touch operation, or the user may keep the touch state of a previous touch operation while performing the next touch operation.

In other words, whenever the user performs a touch operation on the touch panel 5a, the second touch-area detecting unit 206b acquires a position signal related to the X and Y coordinates of the touch position and output from the touch panel 5a and acquires the time of touching on the touch panel 5a from a clocking unit (not shown). Further, with respect to each of user's operations on the touch panel 5a, the second touch-area detecting unit 206b detects an area where the acquired position signal is included, from among the plurality of areas into which the touch panel 5a is partitioned. Furthermore, with respect to a touch operation consecutively performed within the predetermined time from the time of performance of another touch operation on any area of the touch panel 5a, the second touch-area detecting unit 206b detects the order of the touch operations on the plurality of areas of the touch panel 5a.

Similarly to the first switching control unit 6c, the second switching control unit 206c controls switching display of a plurality of frame images constituting a video. Also, the second switching control unit 206c controls switching display based on the order of a plurality of touch operations performed at a time interval in the plurality of user's touch operations on the touch panel 5a detected by the second touch-area detecting unit 206b. Specifically, based on the order of the plurality of touch operations detected by the second touch-area detecting unit 206b, the second switching control unit 206c controls adjustment on the switching speed of a plurality of frame images constituting the video, and switching display with the control content other than adjustment on the switching speed.

For example, as shown in FIG. 6A, in a case where the touch panel 5a is partitioned into two areas of the first area A1 and the second area A2, in a case where a touch area of the user is the "first area A1", if the number of touches is "1", a "FORWARD 1× SPEED REPRODUCTION" process is performed, and if two touch operations are simultaneously or consecutively performed by the user (the touch mode is a "SIMULTANEOUS OR CONSECUTIVE" mode and the number of touches is "2"), a "FORWARD 2× SPEED REPRODUCTION" process is performed, and if three touch operations are simultaneously or consecutively performed by the user (the touch mode is the "SIMULTANEOUS OR CONSECUTIVE" mode and the number of touches "3"), a "FORWARD 3× SPEED REPRODUCTION" process is performed. Meanwhile, in a case where a touch area of the user is the "second area A2", if the number of touches is "1", a "BACKWARD 1× SPEED REPRODUCTION" process is performed, and if two touch areas are simultaneously or consecutively performed by the user (the touch mode is the "SIMULTANEOUS OR CONSECUTIVE" mode and the number of touches is "2"), a "BACKWARD 2× SPEED REPRODUCTION" process is performed, and if three touch areas are simultaneously or consecutively performed by the user (the touch mode is the "SIMULTANEOUS OR CONSECUTIVE" mode and the number of touches is "3"), a "BACKWARD 3× SPEED REPRODUCTION" process is performed.

Also, in a case where touch areas of the user are the "first area A1" and the "second area A2", if touch operations are simultaneously performed on the first area A1 and the second area A2 (the number of touches is "2" and the touch mode is a "SIMULTANEOUS" mode), a "PAUSE" process is performed, and if an touch operation on the first area A1 and an touch operation on the second area A2 are consecutively performed by the user (the number of touches is "2"

and the touch mode is a "CONSECUTIVE" mode in which the first area is first touched), a "FORWARD ½× SPEED REPRODUCTION" process is performed, and if an touch operation on the second area A2 and a touch operation on the first area A1 are consecutively performed by the user (the number of touches is "2" and the touch mode is a "CONSECUTIVE" mode in which the second area is first touched), a "BACKWARD ½× SPEED REPRODUCTION" process is performed.

Also, for example, as shown in FIG. 6B, in a case where the touch panel 5a is partitioned into four areas of the first to fourth areas A1 to A4, if the user performs touch operations only on the first area A1 and the second area A2, processes identical to those of FIG. 6A described above are performed. Also, in a case where a touch area of the user is the "third area A3", if the number of touches "1", a "FORWARD 1× SPEED REPRODUCTION" process is performed, and if two touch operations are simultaneously or consecutively performed by the user (the touch mode is the "SIMULTANEOUS OR CONSECUTIVE" mode and the number of touches "2"), a "FORWARD ½× SPEED REPRODUCTION" process is performed, and if three touch operations are simultaneously or consecutively performed by the user (the touch mode is the "SIMULTANEOUS OR CONSECUTIVE" mode and the number of touches is "3"), a "FORWARD ⅓× SPEED REPRODUCTION" process is performed. Meanwhile, in a case where a touch area of the user is the "fourth area A4", if the number of touches is "1", a "BACKWARD 1× SPEED REPRODUCTION" process is performed, and if two touch operations are simultaneously or consecutively performed by the user (the touch mode is the "SIMULTANEOUS OR CONSECUTIVE" mode and the number of touches is "2"), a "BACKWARD ½× SPEED REPRODUCTION" process is performed, and if three touch operations are simultaneously or consecutively performed by the user (the touch mode is the "SIMULTANEOUS OR CONSECUTIVE" mode and the number of touches is "3"), a "BACKWARD ⅓× SPEED REPRODUCTION" process is performed.

Also, in a case where touch areas of the user is the "first area A1" and the "second area A2", if touch operations are simultaneously performed on the first area A1 and the second area A2 (the number of touches is "2" and the touch mode is the "SIMULTANEOUS" mode), a "PAUSE" process is performed, and if a touch operation on the first area A1 and a touch operation on the second area A2 are consecutively performed by the user (the number of touches is "2" and the touch mode is the "CONSECUTIVE" mode in which the first area is first touched), a "FORWARD FRAME ADVANCE" process is performed, and if a touch operation on the second area A2 and a touch operation on the first area A1 are consecutively performed by the user (the number of touches is "2" and the touch mode is the "CONSECUTIVE" mode in which the second area is first touched), a "BACKWARD FRAME ADVANCE" process is performed. Meanwhile, if touch areas of the user are the "first area A1" and the "third area A3", and two touch operations are simultaneously or consecutively performed by the user (the touch mode is the "SIMULTANEOUS OR CONSECUTIVE" mode and the number of touches is "2"), a "JUMP TO END" process is performed. Meanwhile, in a case where touch areas of the user are the "first area A1" and the "fourth area A4", if touch operations are simultaneously performed on the first area A1 and the fourth area A4 (the number of touches is "2" and the touch mode is the "SIMULTANEOUS" mode"), a "PAUSE" process is performed, and if a touch operation on the first area A1 and a touch operation on the fourth area A4 are consecutively performed by the user (the number of touches is "2" and the touch mode is the "CONSECUTIVE" mode in which the first area is first touched), a "FORWARD CHAPTER ADVANCE" process is performed, and if a touch operation on the fourth area A4 and a touch operation on the first area A1 are consecutively performed by the user (the number of touches is "2" and the touch mode is a "CONSECUTIVE" mode in which the fourth area is first touched, a "BACKWARD CHAPTER ADVANCE" process is performed. Also, in a case where touch areas of the user is the "second area A2" and the "third area A3", if touch operations are simultaneously performed on the second area A2 and the third area A3 (the number of touches is "2" and the touch mode is the "SIMULTANEOUS" mode), a "PAUSE" process is performed, and if a touch operation on the second area A2 and a touch operation on the third area A3 are consecutively performed by the user (the number of touches is "2" and the touch mode is the "CONSECUTIVE" mode in which the second area is first touched), a "BACKWARD CHAPTER ADVANCE" process is performed, and if a touch operation on the third area A3 and a touch operation on the second area A2 are consecutively performed by the user (the number of touches is "2" and the touch mode is a "CONSECUTIVE" mode in which the third area is first touched), a "FORWARD CHAPTER ADVANCE" process is performed. Also, in a case where touch areas of the user are the "second area A2" and the "fourth area A4", if two touch operations are simultaneously or consecutively performed by the user (the touch mode is the "SIMULTANEOUS OR CONSECUTIVE" mode and the number of touches is "2", a "JUMP TO BEGINNING" process is performed. Also, in a case where touch areas of the user are the "third area A3" and the "fourth area A4", if touch operations are simultaneously performed on the third area A3 and the fourth area A4 (the number of touches is "2" and the touch mode is the "SIMULTANEOUS" mode), a "PAUSE" process is performed, and if a touch operation on the third area A3 and a touch operation on the fourth area A4 are consecutively performed by the user (the number of touches is "2" and the touch mode is the "CONSECUTIVE" mode in which the third area is first touched), a "FORWARD FRAME ADVANCE" process is performed, and if a touch operation on the fourth area A4 and a touch operation on the third area A3 are consecutively performed by the user (the number of touches is "2" and the touch mode is the "CONSECUTIVE" mode in which the fourth area is first touched), a "BACKWARD FRAME ADVANCE" process is performed.

Also, the processes shown in FIGS. 6A and 6B are examples of switching display processes, and similarly to the processes shown in FIGS. 3A and 3B, the speed and direction of switching of frame images, the contents of the processes, and so on can be appropriately and arbitrarily changed.

Now, the timing when the second switching control unit 206c starts switching display control will be described.

As described above, if a touch operation is performed on any area of the touch panel 5a, until the predetermined time elapses, the second touch-area detecting unit 206b monitors whether the next touch operation is consecutively performed. In other words, in order to determine whether one touch operation and another touch operation are performed at a time interval or only one touch operation is performed (the number of touch operations does not matter), it is required for the predetermined time to elapse from the time when one touch operation is performed.

For this reason, the second switching control unit 206c is configured so as to normally start switching display control if the predetermined time elapses from the time when one touch operation is performed. However, for example, in a case where one touch operation was performed and then the next touch operation has been performed within the predetermined time (a case which is determined as consecutive touch operations have been performed at a time interval), the second switching control unit may start switching display control at a time before the predetermined time elapses from the time of performance of the first touch operation (such as the time of performance of the next touch operation).

<Reproducing Process>

Now, a reproducing process of the display apparatus 200 will be described with reference to FIGS. 7 and 8.

Figure 7:
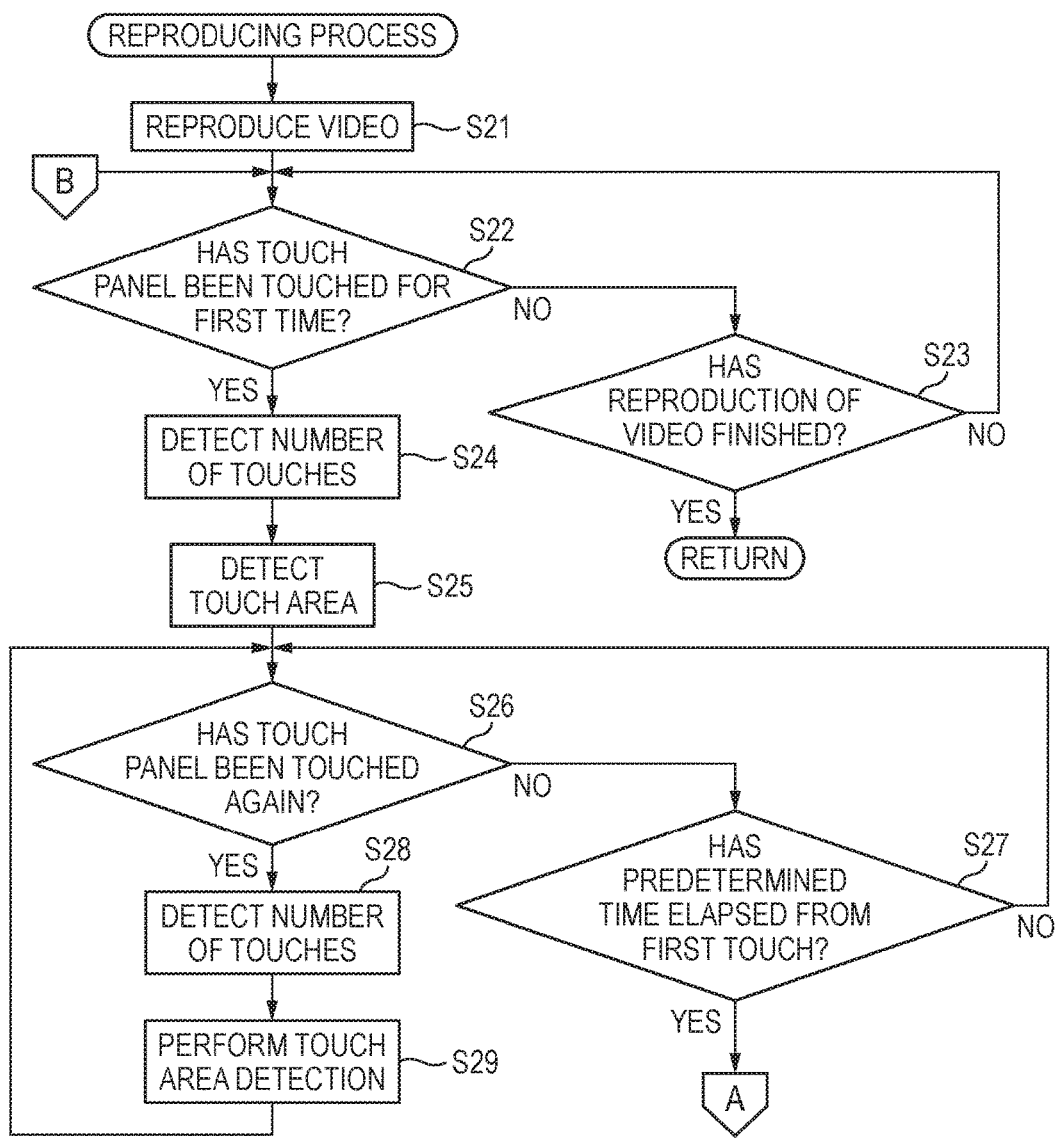
FIG. 7 is a flow chart illustrating examples of operations related to a reproducing process which is performed by the display apparatus of FIG. 5.
Figure 8:
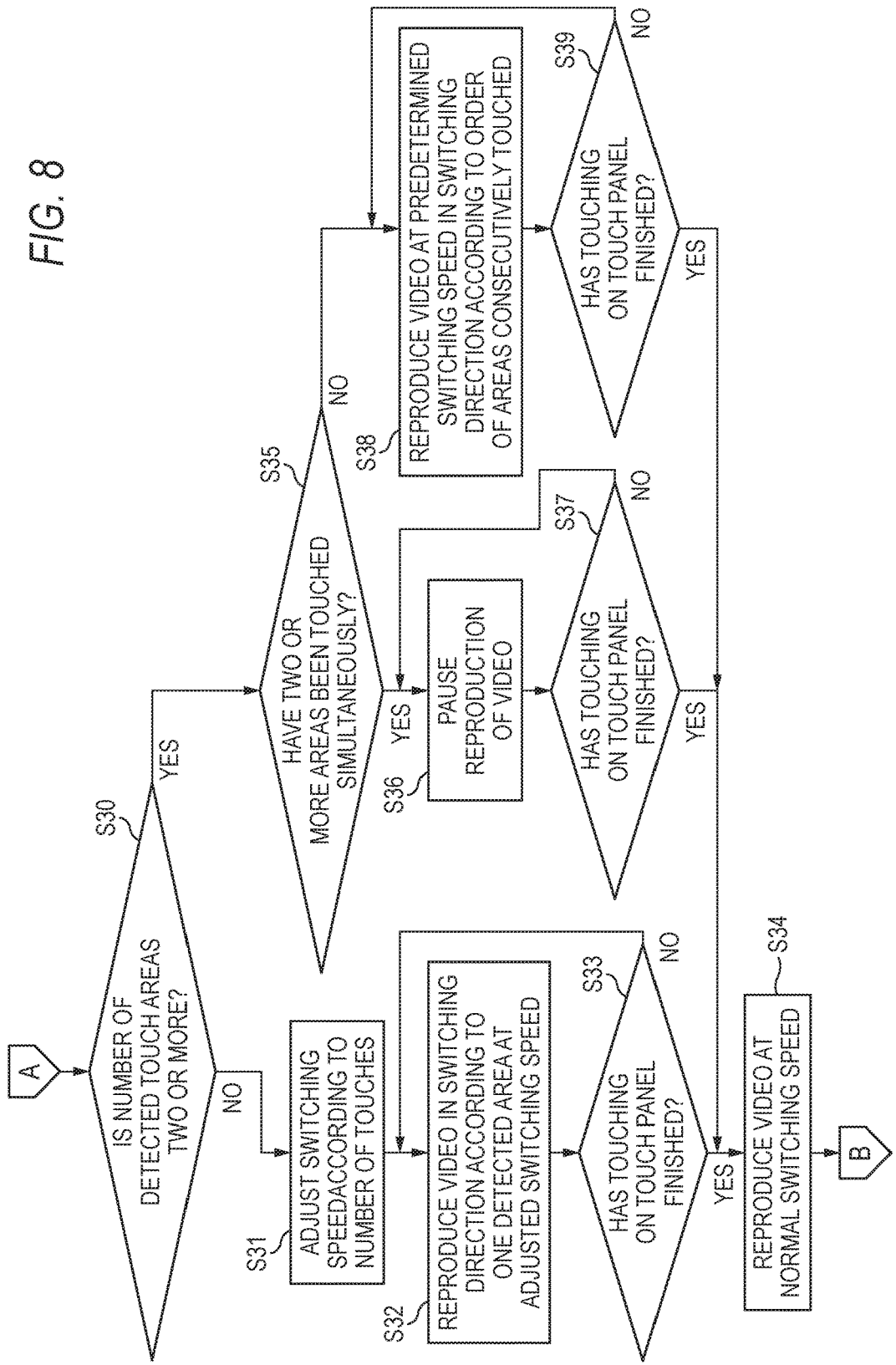
FIG. 8 is a flow chart illustrating the other portion of the reproducing process of FIG. 7.

FIGS. 7 and 8 are flow charts illustrating examples of operations related to the reproducing process.

Also, on the assumption that the touch panel 5a is partitioned into two areas of the first area A1 and the second area A2, the reproducing process will be described below. Also, it is assumed that adjustment on the speed of switching of frame images is performed only in a period when the user touches the touch panel 5a.

As shown in FIG. 7, if a video is first designated, as a display object, from among videos recorded in the image recording unit 3, based on a predetermined operation performed on the operation input unit 5 by the user, almost similarly in the reproducing process of the first embodiment described above, the operation processing unit 206 outputs a plurality of frame images constituting the designated video to the display unit 4, and the second switching control unit 206c reproduces the video on the display panel 4a at a predetermined reproduction frame rate (for example, 30 fps) in STEP S21.

Subsequently, in STEP S22, the operation processing unit 206 determines whether any touch operation (a first touch operation) has been performed on the touch panel 5a by the user.

If it is determined in STEP S22 that any touch operation has not been performed on the touch panel 5a ("NO" in STEP S22), in STEP S23, the operation processing unit 206 determines whether reproduction of the video has finished.

If it is determined in STEP S23 that reproduction of the video has not finished ("NO" in STEP S23), the operation processing unit 206 returns the reproducing process to STEP S22, thereby repeatedly performing the process of determining whether the touch panel 5a has been touched, at predetermined time intervals.

Meanwhile, if it is determined in STEP S23 that reproduction of the video has finished ("YES" in STEP S23), the operation processing unit 206 finishes the reproducing process.

If it is determined in STEP S22 that a touch operation has been performed on the touch panel 5a ("YES" in STEP S22), in STEP S24, almost similarly in the reproducing process of the first embodiment described above, the number-of-touches detecting unit 6a acquires a position signal related to the X and Y coordinates of the touch position and output from the touch panel 5a, and detects the number of touch operations based on the acquired position signal. Subsequently, in STEP S25, the second touch-area detecting unit 206b acquires the position signal related to the X and Y coordinates of the touch position and output from the touch panel 5a, and detects an area where the acquired position signals is included, from among the plurality of areas into which the touch panel 5a is partitioned, and acquires the time of the touch operation on the touch panel 5a from the clocking unit (not shown).

Subsequently, in STEP S26, the operation processing unit 206 determines whether any other touch operations (second and subsequent touch operations) have been performed on the touch panel 5a by the user.

If it is determined in STEP S26 that any other touch operations have not been performed ("NO" in STEP S26), in STEP S27, the operation processing unit 206 determines whether the predetermined time has elapsed from the time of performance of the first touch operation on the touch panel 5a.

If it is determined in STEP S27 that the predetermined time has not elapsed from the time of performance of the first touch operation on the touch panel 5a ("NO" in STEP S27), the operation processing unit 206 returns the reproducing process to STEP S26, and determines whether any other touch operations (second and subsequent operations) have been performed on the touch panel 5a, as described above, in STEP S26.

If it is determined in STEP S26 that any other touch operations have been performed ("YES" in STEP S26), in STEP S28, similarly in STEP S24, the number-of-touches detecting unit 6a acquires position signals related to the X and Y coordinates of touch positions and output from the touch panel 5a, and detects the number of touch operations based on the acquired position signals. Subsequently, in STEP S29, similarly in STEP S25, the second touch-area detecting unit 206b acquires the position signals related to the X and Y coordinates of the touch positions and output from the touch panel 5a, and detects areas where the acquired position signals are included, from among the plurality of areas into which the touch panel 5a is partitioned, and acquires the times of the touch operations on the touch panel 5a from the clocking unit (not shown).

Thereafter, the operation processing unit 206 returns to STEP S26, and repeats determination on whether any other touch operations (second and subsequent touch operations) have been performed on the touch panel 5a.

Thereafter, if it is determined in a STEP S27 that the predetermined time has elapsed from the time of performance of the first touch operation on the touch panel 5a ("YES" in STEP S27), as shown in FIG. 8, in STEP S30, the second switching control unit 206c determines whether a plurality of areas (for example, the first area A1 and the second area A2) has detected by the second touch-area detecting unit 206b.

If it is determined in STEP S30 that a plurality of areas has not detected ("NO" in STEP S30), in STEP S31, according to the number of touch operations (for example, "2") detected by the number-of-touches detecting unit 6a, the second switching control unit 206c adjusts the switching speed (for example, to 2× speed) for switching a plurality of frame images constituting the video. Subsequently, in STEP S32, the second switching control unit 206c reproduces the video at the adjusted switching speed by switching display (for example, forward 2× speed reproduction) for switching a plurality of frame images in a switching direction (for example, forward advance) associated with one area (for example, the first area A1) detected by the second touch-area detecting unit 206b.

Subsequently, in STEP S33, the operation processing unit 206 determines whether touching of the user on the touch panel 5a has finished.

If it is determined in STEP S33 that touching of the user on the touch panel 5a has not finished ("NO" in STEP S33), the second switching control unit 206c returns the reproducing process to STEP S32, and performs control on switching display of a plurality of frame images according to the touching of the user on the touch panel 5a.

If it is determined in STEP S33 that touching of the user on the touch panel 5a has finished ("YES" in STEP S33), in STEP S34, the second switching control unit 206c returns the speed of switching of a plurality of frame images to the normal switching speed (for example, 1× speed), and reproduces the video.

Thereafter, the operation processing unit 206 returns the reproducing process to STEP S22.

Meanwhile, if it is determined in STEP S30 that a plurality of areas has been detected ("YES" in STEP S30), in STEP S35, the second switching control unit 206c determines whether the plurality of areas detected by the second touch-area detecting unit 206b was simultaneously touched by the user.

If it is determined in STEP S35 that the plurality of areas was simultaneously touched by the user ("YES" in STEP S35), in STEP S36, the second switching control unit 206c pauses the video while keeping a frame image displayed on the display panel 4a.

Subsequently, in STEP S37, the operation processing unit 206 determines whether touching of the user on the touch panel 5a has finished.

If it is determined in STEP S37 that touching of the user on the touch panel 5a has not finished ("NO" in STEP S37), the second switching control unit 206c returns the reproducing process to STEP S36, and keeps the pause state of the video with the frame image displayed on the display panel 4a.

If it is determined in STEP S37 that touching of the user on the touch panel 5a has finished ("YES" in STEP S37), the second switching control unit 206c advances the reproducing process to STEP S34. In STEP S34, the first switching control unit returns the speed of switching of a plurality of frame images to the normal switching speed (for example, 1× speed), and reproduces the video.

Thereafter, the operation processing unit 206 returns the reproducing process to STEP S22.

Meanwhile, if it is determined in STEP S35 that the plurality of areas was not simultaneously touched by the user ("NO" in STEP S35), in STEP S38, the second switching control unit 206c specifies the order in which the plurality of areas was touched (for example, the first area A1 was first touched), and reproduces the video by switching display (for example, forward ½× speed reproduction) for switching a plurality of frames in a switching direction (for example, the forward direction) according to the specified order, at a predetermined switching speed (for example, ½× speed).

Thereafter, in STEP S39, the operation processing unit 206 determines whether touching of the user on the touch panel 5a has finished.

If it is determined in STEP S39 that touching of the user on the touch panel 5a has not finished ("NO" in STEP S39), the second switching control unit 206c returns the reproducing process to STEP S38, and keeps controlling switching display for switching a plurality of frame images, at the predetermined switching speed, in the switching direction according to the order in which the plurality of areas was touched.

If it is determined in STEP S39 that touching of the user on the touch panel 5a has finished ("YES" in STEP S39), the second switching control unit 206c advances the reproducing process to STEP S34. In STEP S34, the second switching control unit returns the speed of switching of a plurality of frame images to the normal switching speed (for example, 1× speed), and reproduces the video.

Thereafter, the operation processing unit 206 returns the reproducing process to STEP S22.

As described above, according to the display apparatus 200 of the second embodiment, similarly in the first embodiment described above, it is possible to increase selectable types of frame image switching display in association with combinations of the numbers and areas of touch operations which are performed in user's simultaneous or consecutive touch operations, and even if an installable touch panel 5a is limited in size, it is possible to suppress a reduction in operability enabling the user to select predetermined switching display. Especially, when the user performs a plurality of touch operations on the touch panel 5a, in a case where a plurality of touch operations is performed at a time interval, like a case where a plurality of touch operations is consecutively performed on the touch panel 5a within the predetermined time, the display apparatus controls switching display based on the order in which the plurality of touch operations was performed on a plurality of areas. Therefore, it is possible to change the switching direction or the switching speed, or to pause the video while keeping a displayed frame image, or to perform switching to a predetermined image, by only changing the order of a plurality of touch operations which is performed when the user performs a plurality of touch operations on the touch panel 5a, and the user can implement selection of predetermined switching display by an easier operation.

Also, the present invention is not limited to the first and second embodiments described above, and various improvements and design changes may be made to the embodiments without departing from the scope of the present invention.

Hereinafter, a display apparatus 300 of a first modification will be described with reference to FIG. 9.

Also, the configuration and functions of the display apparatus 300 other than points to be described below are substantially identical to those of the display apparatuses 100 and 200 of the first and second embodiments described above, and thus a description thereof will not be made.

<First Modification>

Figure 9:
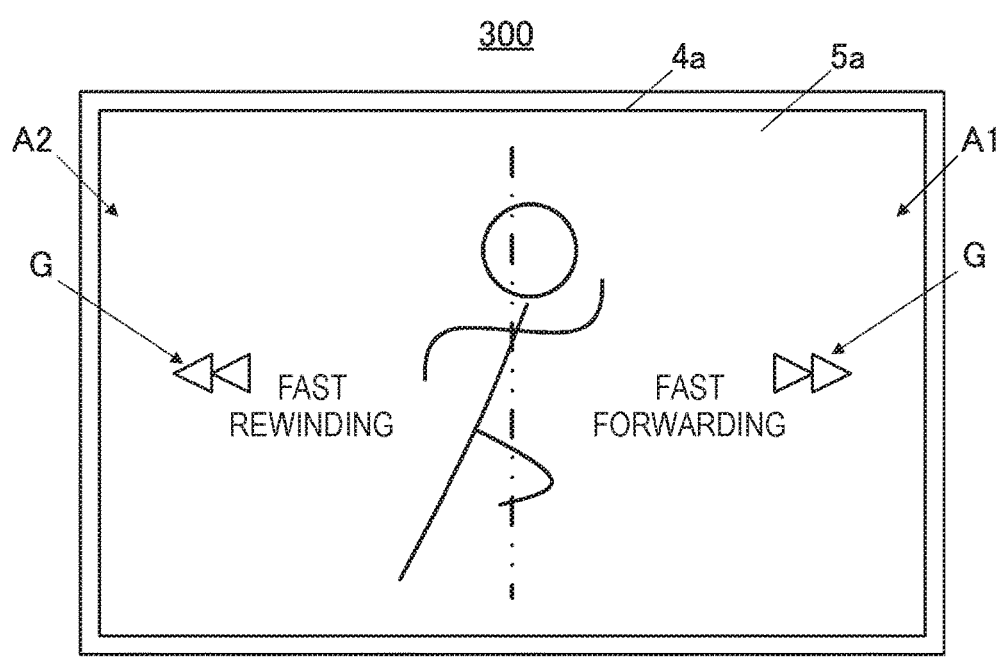
FIG. 9 is a view schematically illustrating an example of a guidance display which is performed by a display apparatus of a first modification.

FIG. 9 is a view schematically illustrating an example of a guidance display which is performed by the display apparatus 300 of the first modification.

The display apparatus 300 of the first modification displays a frame image switching method, as a guide, on the display panel 4a (see FIG. 9).

In other words, in a case where the number of touch operations detected by the number-of-touches detecting unit 6a is "1", the first switching control unit 6c (or the second switching control unit 206c) performs control such that the display panel 4a displays a guidance image representing a frame image switching method regarding switching display for switching a frame image displayed on the display panel 4a to another frame image.

Specifically, for example, if the user performs a touch operation on any one position of the touch panel 5a, the first switching control unit 6c performs control such that the display panel 4a displays a guidance image G representing switching directions, switching speeds, and the like associated with a plurality of areas into which the touch panel 5a is partitioned, on a frame image. Also, for example, in a period where touching of the user on the touch panel 5a continues, the first switching control unit 6c performs control such that the display panel 4a displays the guidance image G on the frame image.

In this case, in order to prevent erroneous operations such as a momentary touch operation of the user on the touch panel 5a, for example, the first switching control unit 6c may measure the time when a touch operation of the user on the touch panel 5a continues, and performs control such that the display panel 4a displays the guidance image G, in a case where the measure time is equal to or longer than a predetermined time (for example, 200 ms).

Therefore, according to the display apparatus 300 of the first modification, in a case where the number of touch operations which are performed when the user performs a plurality of touch operations on the touch panel 5a is "1", the display apparatus performs control such that the display panel 4a displays the guidance image representing the frame image switching method regarding switching display. Therefore, the user can perform various touch operations on the touch panel 5a, using the guidance image G displayed on the display panel 4a, and it is possible to improve operability enabling the user to select predetermined switching display.

Also, the first switching control unit 6c may change the content of the guidance image G and the content of switching display control, depending on areas of the touch panel 5a touched by the user. For example, forward switching display such as "forward 2× speed reproduction" is associated as the content of switching display control with the first area A1 of the touch panel 5a, and backward switching display such as "backward 2× speed reproduction" is associated as the content of switching display control with the second area A2. In this state, in a case where the user performs a touch operation on the first area A1 of the touch panel 5a corresponding to the guidance image G related to "FAST FORWARDING", the first switching control unit 6c performs control such that a guidance image (not shown) related to "PAUSE" is displayed, in place of the guidance image G related to "FAST REWINDING", in an area corresponding to the second area A2 of the display panel 4a, and performs pausing while keeping a frame image displayed on the display panel 4a and including the content of switching display control corresponding to the second area A2.

Also, switching display control for switching a frame image displayed on the display panel 4a to another frame image may be performed based on a plurality of areas, including touch positions touched when the user performed a plurality of touch operations on the touch panel 5a, of the plurality of areas into which the touch panel 5a is partitioned. In other words, the first touch-area detecting unit 6b of the first embodiment (or the second touch-area detecting unit 206b of the second embodiment) serving as a detecting unit detects a plurality of areas, including touch positions touched when the user performed a plurality of touch operations on the touch panel 5a, of the plurality of areas into which the touch panel 5a is partitioned. Then, the first switching control unit 6c of the first embodiment (or the second switching control unit 206c of the second embodiment) serving as a control unit controls switching display based on the plurality of detected areas.

Even in this configuration, it is possible to increase selectable types of frame image switching display in association with combinations of a plurality of touch operations which are performed in user's simultaneous or consecutive touch operations, and even if an installable touch panel 5a is limited in size, it is possible to suppress a reduction in operability enabling the user to select predetermined switching display.

In the above described configuration, in a case where a plurality of areas of the touch panel 5a is touched when the user performs a plurality of touch operations on the touch panel 5a, according to a combination of the plurality of detected areas, pausing may be performed while a frame image displayed on the display panel 4a is kept, or switching to a predetermined image, or the like may be performed.

Also, in a case where a plurality of areas of the touch panel 5a is touched by the user, whereby pausing is performed while a frame image displayed on the display panel 4a is kept, and then any one touch position of the plurality of touch positions included in the plurality of areas of the touch panel 5a is kept in the touch state while another touch position is released from the touch state and is touched, thereby returning to the touch state, switching to a predetermined image may be performed by any one of image advance modes of one or plurality of images.

Also, a plurality of touch operations which is performed on the touch panel 5a by the user may be touch operations which are performed at individual touch positions on the touch panel 5a at a time interval as long as touch states of the touch positions can be simultaneously secured.

Also, when the user performs a plurality of touch operations on the touch panel 5a, in a case where a plurality of touch operations is performed at a time interval, like a case where a plurality of touch operations is consecutively performed on the touch panel 5a within a predetermined time, switching display may be controlled based on the order in which the plurality of touch operations was performed on a plurality of areas.

Also, in the first and second embodiments, a case where display objects are videos has been described. However, the present invention is not limited thereto. For example, display objects may be a plurality of still images. In this case, the direction of image switching corresponds to the read order of the still images (such as the order of file names, or the order of storage).

Also, a plurality of touch operations which is performed on the touch panel 5a when the user performs a plurality of touch operations may be, for example, a pinch operation. In this case, according to the position, interval, and the like of the pinch operation, the speed of frame image switching may be adjusted, or pausing may performed while a displayed frame image is kept, or switching to a predetermined image, or the like may be performed.

Further, the configurations of the display apparatuses 100 and 200 shown in the first and second embodiments are examples, and the present invention is not limited thereto.

Besides, in the first and second embodiment, the functions of the number detecting unit, the area detecting unit, and the control unit are implemented by driving the number-of-touches detecting unit 6a, the first touch-area detecting unit 6b (the second touch-area detecting unit 206b), and the first switching control unit 6c (the second switching control unit 206c) under control of the central control unit 1. However, the present invention is not limited thereto. Those functions may be implemented by executing a predetermined program or the like by the processor of the central control unit 1.

In other words, in a program memory (not shown), a program including a number detection process routine, an area detection process routine, and a control process routine is recorded. In this case, the number detection process routine may cause the processor of the central control unit 1 to implement the function of detecting the number of touch operations which are performed when the user s performs a plurality of touch operations on the touch panel 5a. Also, the area detection process routine may cause the processor of the central control unit 1 to implement the function of detecting areas, including touch positions touched when the user performs a plurality of touch operations, of a plurality of areas into which the touch panel 5a is partitioned. Also, the control process routine may cause the processor of the central control unit 1 to implement the function of controlling switching display based on the number of detected touch operations and detected areas.

Similarly, in the program memory, a program including an area detection process routine and a continuous is recorded. In this case, the area detection process routine may cause the processor of the central control unit 1 to implement a function of detecting a plurality of areas, including touch positions touched when the user performs a plurality of touch operations on the touch panel 5a, of a plurality of areas into which the touch panel 5a is partitioned. Also, the control process routine may cause the processor of the central control unit 1 to implement a function of controlling switching display based on the plurality of detected areas.

Further, as a computer-readable recording medium which retains the above described program for implementing the individual processes, besides a ROM and a hard disk drive, a non-volatile memory such as a flash memory, and a portable recording medium such as a CD-ROM can also be applied. Also, as a medium for providing data on the program through a predetermined communication line, a carrier wave may be applied.

Although some embodiments of the present invention have been described, the scope of the present invention is not limited to the above described embodiments, and includes the scopes of inventions disclosed in claims and the scopes of their equivalents.

What is claimed is:

1. A display apparatus comprising:
a touch panel;
a display unit; and
a processor that is configured to:
    perform display control for controlling display of an image displayed on the display unit, based on touch operations performed by a user on the touch panel;
    detect plural areas, each of the detected plural areas including a touch position of a respective one of a plurality of touch operations which are performed by the user simultaneously, from among a plurality of areas into which the touch panel is partitioned; and
    detect control information which corresponds to a combination of the detected plural areas, from among plural types of control information, each of the plural types of control information being related to performing the display control,
wherein the display control is performed based on the detected control information.

2. The display apparatus according to claim 1, wherein:
the processor is further configured to:
    store plural different combinations of the detected plural areas; and
    detect, as the control information, control information of a type which corresponds to the combination of the detected plural areas which is one of the plural different combinations of the detected plural areas.

3. The display apparatus according to claim 1, wherein:
the plural types of control information include control information for performing switching display of the image displayed on the display unit to another image.

4. The display apparatus according to claim 3, wherein:
the plurality of areas respectively correspond to switching directions of the switching display, one switching direction being different from another switching direction.

5. The display apparatus according to claim 3, wherein:
in a case where a number of the detected plural areas is two or more areas, the control information for performing the switching display has a control content other than an adjustment of a switching speed of the switching.

6. The display apparatus according to claim 5, wherein:
the control content other than the adjustment of the switching speed includes at least one of pausing in a state where an image displayed on the display unit is kept, and switching to a predetermined image.

7. The display apparatus according to claim 6, wherein:
in a case where the control content is pausing, and where one touch position included in one of the two or more areas is kept in a touch state while another touch position is released from another touch state and is touched again to return to said another touch state, the processor performs the switching display so as to switch to a predetermined image.

8. The display apparatus according to claim 5, wherein:
in a case where the plurality of touch operations are performed at a time interval, the processor is configured to:
    further detect an order of the plurality of touch operations performed on the two or more areas; and
    control the switching display based on the detected order of the plurality of touch operations performed on the two or more areas.

9. The display apparatus according to claim 5, wherein:
the plurality of touch operations include a plurality of touch operations which are consecutively performed on the touch panel within a predetermined time; and
in a case where a plurality of touch operations are consecutively performed on the touch panel within the predetermined time, the processor further detects an order of the plurality of touch operations performed on the two or more areas.

10. The display apparatus according to claim 5, wherein:
in a case where touch states of plural touch positions are simultaneously secured, the plurality of touch operations include touch operations which are performed at individual touch positions on the touch panel at a time interval.

11. The display apparatus according to claim 3, wherein:
the processor is further configured to:
    detect a number of touch operations performed when the user performs the plurality of touch operations on the touch panel; and
    control the switching display, based on the detected number of touch operations and the detected plural areas.

12. A display apparatus comprising:
a touch panel;
a display unit; and
a processor that is configured to:
    perform display control for controlling display of an image displayed on the display unit, based on a plurality of touch operations performed by a user on the touch panel;
    detect plural areas, each of the detected plural areas including a touch position of a respective one of the plurality of touch operations performed by the user on the touch panel, from among a plurality of areas into which the touch panel is partitioned;
    detect first control information which corresponds to a combination of the detected plural areas in which the plurality of touch operations are performed by the user simultaneously; and perform a first control based on the detected first control information, wherein the display control is performed based on the detected plural areas in a case where the processor keeps the first control.

13. The display apparatus according to claim 12, wherein:
the first control information is one of plural types of control information, the plural types of control information including control information for performing switching display of the image displayed on the display unit to another image.

14. The display apparatus according to claim 13, wherein:
the processor performs either pausing in a state where an image displayed on the display unit is kept, or switching to a predetermined image, according to a combination of the detected plural areas.

15. The display apparatus according to claim 14, wherein:
in a pausing state where the processor performs pausing, and in a case where one touch position included in one of the detected plural areas is kept in a touch state while another touch position is released from another touch state and is touched again to return to said another touch state, the processor performs the switching display so as to switch to a predetermined image.

16. The display apparatus according to claim 13, wherein:
in a case where touch states of plural touch positions are simultaneously secured, the plurality of touch operations include touch operations which are performed at individual touch positions on the touch panel at a time interval.

17. The display apparatus according to claim 16, wherein:
in a case where the plurality of touch operations are performed at a time interval, the processor is configured to:
further detect an order of the plurality of touch operations performed on the plural areas; and
control the switching display based on the detected order of the plurality of touch operations performed on the plural areas.

18. The display apparatus according to claim 13, wherein:
the plurality of touch operations include a plurality of touch operations which are consecutively performed on the touch panel within a predetermined time,
in a case where a plurality of touch operations are consecutively performed on the touch panel within the predetermined time, the processor further detects an order of the plurality of touch operations performed on the plural areas; and
the processor controls the switching display based on the detected order of the plurality of touch operations performed on the plural areas.

19. The display apparatus according to claim 13, wherein:
in a case where the processor keeps the first control and in a case where the processor detects the plural areas, the processor controls the switching display based on the detected plural areas.

20. The display apparatus according to claim 13, wherein:
in a case where the processor keeps the first control while the processor consecutively controls the switching display and in a case where the processor detects the plural areas, the processor controls the switching display based on the detected plural areas.

21. The display apparatus according to claim 12, wherein:
the processor is further configured to:
store plural different combinations of the detected plural areas; and
detect, as the first control information, from among plural types of control information, control information of a type which corresponds to the combination of the detected plural areas which is one of the plural different combinations of the detected plural areas.

22. A display method using a display apparatus which performs display control for controlling display of an image displayed on a display unit based on touch operations performed by a user on a touch panel, the method comprising:
detecting plural areas, each of the detected plural areas including a touch position of a respective one of a plurality of touch operations which are performed by the user simultaneously, from among a plurality of areas into which the touch panel is partitioned;
detecting control information which corresponds to a combination of the detected plural areas, from among plural types of control information, each of the plural types of control information being related to performing the display control; and
performing the display control based on the detected control information.

23. A display method using a display apparatus which performs display control for controlling display of an image displayed on a display unit based on a plurality of touch operations performed by a user on a touch panel, the method comprising:
detecting plural areas, each of the detected plural areas including a touch position of a respective one of the plurality of touch operations performed by the user on the touch panel, from among a plurality of areas into which the touch panel is partitioned;
detecting first control information which corresponds to a combination of the detected plural areas in which the plurality of touch operations are performed by the user simultaneously;
performing a first control based on the detected first control information; and
performing the display control based on the detected plural areas in a case where the first control is kept.

* * * * *